United States Patent [19]

Murphy

[11] Patent Number: 4,653,429
[45] Date of Patent: Mar. 31, 1987

[54] PROCESS AND APPARATUS FOR PREPARATION OF BIVALVES FOR HUMAN CONSUMPTION

[75] Inventor: John Murphy, Smithtown, N.Y.

[73] Assignee: Judith O'Neill, Hicksville, N.Y.

[21] Appl. No.: 777,618

[22] Filed: Sep. 19, 1985

[51] Int. Cl.$^4$ ............................................. A01K 61/00
[52] U.S. Cl. ..................................................... 119/4
[58] Field of Search ........................................ 119/4, 3

[56] References Cited

U.S. PATENT DOCUMENTS

| | | | |
|---|---|---|---|
| 3,192,899 | 7/1965 | Lucey et al. | 119/4 |
| 3,418,138 | 12/1968 | Dennis et al. | 119/4 X |
| 3,495,572 | 2/1970 | Groves | 119/3 |
| 3,641,982 | 2/1972 | Woodridge et al. | 119/4 |
| 3,658,034 | 4/1972 | Day et al. | 119/2 |
| 4,074,651 | 2/1978 | Arduser | 114/255 |
| 4,171,681 | 10/1979 | Berger et al. | 119/3 |
| 4,240,376 | 12/1980 | Kominami et al. | 119/2 |
| 4,257,351 | 3/1981 | Scura et al. | 119/4 |
| 4,537,149 | 8/1985 | Ryan | 119/4 |

Primary Examiner—Hugh R. Chamblee
Attorney, Agent, or Firm—Hoffmann, Dilworth Barrese & Baron

[57] ABSTRACT

A process and apparatus for preparing bivalves for human consumption which includes depositing the bivalves in a fresh salt water bath maintained at a temperature of from about 46° F. to about 54° F. wherein the water is provided from an aquifer of not more than about 200 feet below the surface of the earth at a rate of from about 0.5 to about 2.0 gallons per minute per bushel, and preferably about 1 gallon per minute per bushel. The oxygen level in the fresh salt water is maintained at a level of from about 4 to about 10 ppm. As a result of the present invention, bivalves recovered, even from uncertified waters, can be sufficiently purified for human consumption in 48 hours without degrading the quality of the bivalves.

23 Claims, 6 Drawing Figures

PROCESS AND APPARATUS FOR PREPARATION OF BIVALVES FOR HUMAN CONSUMPTION

BACKGROUND OF THE INVENTION

The present invention relates to the art of preparing bivalves recovered from a marine environment for human consumption without fear of contaminants resulting from polluted waters.

Bivalves, such as clams, oysters, mussels, etc., have hinged double shells that can be opened and closed by the bivalve which pumps or passes water through its system at various rates while absorbing oxygen from the water and trapping food, such as minute plankton and the like. In recent years, the growth in population around the coastal areas, where many bivalves are recovered for human consumption, has resulted in an increase in discharge of untreated domestic sewage and industrial waste into natural waters. This has rendered many of the otherwise useable beds of bivalves unmarketable because of the accumulation of undesirable microbiological agents, such as disease causing bacteria and viruses. This has been especially true as relates to certain types of hepatitis which has been transmitted through consumption of bivalves.

Consequently, suitable locations for harvesting bivalves for human consumption has been greatly diminished in recent years as a result of bacteriological examinations of the water near the harvesting area. That is, shellfish are not permitted to be taken from areas that contain predetermined bacteria counts or degrees of pollution. Such waters, are known as uncertified waters.

Due to the nature of the bivalve feeding system, however, oysters and clams from a polluted area have the capability of cleansing or depurating themselves when placed in clear waters, under the proper conditions. The rate of depuration varies with the type of bivalve and more specifically with the pumping rate of the particular bivalve. The pumping rate varies with the different conditions of the medium, but the water temperature has been known to be very important.

In the past, it has been suggested to treat tainted bivalves by submerging them in a tank of continuously moving ultraviolet ray treated salt water, the depth of which varies from 1/16th inch to 12 inches from 1 to 336 hours at water temperatures between 34° and 90° F. This system employs the use of a shallow tank from which water is pumped into a second smaller tank placed directly under ultraviolet lamps and then back into the first tank which holds the bivalves.

It has also been suggested in the past to wash the outsides of the shells and the like, by a chlorinated solution to disinfect the outside surfaces of the shells, and then to remove all traces of chlorine, prior to placing the shells in sterile water for self-purification. While these systems have proved satisfactory under certain conditions, and in particular under experimental or laboratory conditions, they have been less satisfactory on a large scale adapted for economic utilization of large harvesting areas located in polluted waters.

Another system disclosed in U.S. Pat. No. 3,641,982 to Woodridge, et al., is an open end system of continuously flowing water taken directly from the source from which the bivalves have been removed and back into the initial water source. This open end system includes a pump which pumps the water from the source through its radiation sterilizer, such as a gamma or nuclear radiation irradiator, or special industrial or commercial ultraviolet water purifiers, so that sterilized water is provided which is substantially similar to the waters from which the oysters have been removed. This water is fed into large tanks at several levels of the tank where oysters may be located on removable shelves. The tanks also have means other than the action produced by the entering water for producing movement of the water in the tank. The water leaves the tank from the bottom and passes through a second sterilizer essentially identical with the first sterilizer and back into the original water source.

As in other prior art systems, the strictly irradiation type of system incurs many problems basically because of the lack of control of the temperature of the water. In particular, this lack of temperature control is degrading to the texture of the bivalve, thus rendering the bivalve meat soft and inelastic. Furthermore, the continuous use of radiation to continuously purify a large volume of bivalves on a commercial scale consumes a great amount of energy. See, for example, U.S. Pat. No. 4,537,149 to Ryan.

It is an object, therefore, of the present invention, to provide an improved bivalve depuration system for preparation of bivalves on a commercial scale without the aforementioned drawbacks. Other benefits and advantages will be realized upon review of the present specification and claims.

A BRIEF DESCRIPTION OF THE INVENTION

The present invention is a system which includes a process and combined apparatus for preparing bivalves for human consumption which includes depositing the bivalves within 48 hours of recovery in the absence of refrigeration, and preferably within about 12 hours of recovery, from a marine environment in a fresh salt water bath maintained at a temperature from about 46° F. to about 54° F., and preferably from about 48° F. to about 52° F. Fresh salt water as used herein refers to salt containing water, e.g., having a salinity of from about 16 to about 35 mg salt per Kg water, recovered from the earth via, for example, a well. The fresh salt water should be provided from an aquifer of not more than about 200 feet below the earth's surface and preferably is from about 75 feet to about 80 feet below the earth's surface at a flow rate of from about 0.5 to about 2.0 gallons per minute per bushel of bivalves, and preferably at a rate of about 1.0 gallon per minute per bushel. Furthermore, the oxygen level in the fresh salt water bath should be maintained at a level from about 4 to about 12 parts per million, and preferably at about 7 ppm, so that bivalves recovered even from uncertified waters are sufficiently purified for human consumption. In this process, the bivalves should be deposited at least about 48 hours before removal from the bath in order to prepare them for human consumption.

It has been found that the process of the present invention is best accomplished when the toxic mineral level of the fresh salt water is at an acceptably low level for each of the toxic minerals, such as Mg, Mn, Cu, Sr, Pb, $SO_4$, S, $SO_3$, Al, Ba, B, Co, Fe, Mb, etc.

The oxygenation required to maintain the level in the bath can be accomplished by introducing air into the fresh salt water bath.

The present invention also includes an apparatus for preparing bivalves for human consumption which has, in combination, at least one bath vessel for holding containers of bivalves under fresh salt water and having means for maintaining a liquid therethrough, in the absence of dead space of noncirculating water, of from about 0.5 to about 2.0 gallons per minute per bushel of bivalves, and preferably at a rate of about 1.0 gallon per minute per bushel. The apparatus also includes a source of fresh salt water connected for delivery to the vessel, such source capable of providing fresh salt water having an acceptably low of toxic mineral content at a temperature of from about 48° F. to about 54° F. at a flow rate of from about 0.5 to about 2.0 gallons per minute per bushel of bivalves for at least about 48 hours. Furthermore, the container for the fresh salt water bath can conveniently be purified by draining the bath and irradiating with ultraviolet radiation for from about 1 to about 12 hours while the container is empty, and preferably at least about 6 hours.

Finally, the apparatus also includes means for maintaining the oxygen level in the fresh salt water bath at a level from about 4 to about 12 parts per million. The apparatus can have a depth of from about 1' to about 6', and preferably about 4', whereby the containers of bivalves can be stacked to an appropriate height. In a further preferred embodiment the vessel also includes an overhead purification means having a source of purifying radiation selected from the group consisting of infrared, ultraviolet, ultrasonic, microwave, etc. so that the vessel can be purified.

In a preferred embodiment, the means for maintaining a liquid flow includes at least one fluid injection port and more than one outlet drain having sufficient capacity and dimension to maintain the desired depth of fluid in the vessel at the required rate of liquid flow therethrough. An especially suitable bath has been found to be a circular vessel having four symmetrically arranged injection ports and five outlet drains—one drain in the center and four arranged therearound preferably also symmetrically. This latter arrangement advantageously eliminates all dead spaces of noncirculating water without use of moving parts and/or high velocity water injection, which, of course, can continually disturb contaminants in the fresh salt water bath.

As a result of the present invention, bivalves, such as clams and oysters, can be made suitable for human consumption, even when recovered from uncertified waters, on a commercial scale while maintaining excellent textural qualities and without need for high energy-consuming processing steps.

For a better understanding of the present invention, together with other and further objects, reference is made to the following description, taken in conjunction with the accompanying drawings, and its scope will be pointed out in the appended claims.

A BRIEF DESCRIPTION OF THE DRAWINGS

Preferred embodiments of the invention have been chosen for purposes of illustration and description and are shown in the accompanying drawings wherein.

DETAILED DESCRIPTION OF THE INVENTION

Each of the drawings contained herein depicts so much of that part of the particular embodiment of the invention which is required to provide an adequate understanding thereof. The connecting portions of the apparatus which are not shown or detailed in each drawing are understood as being depicted in accompanying related drawings or are part of the state of the art.

Figure 1:
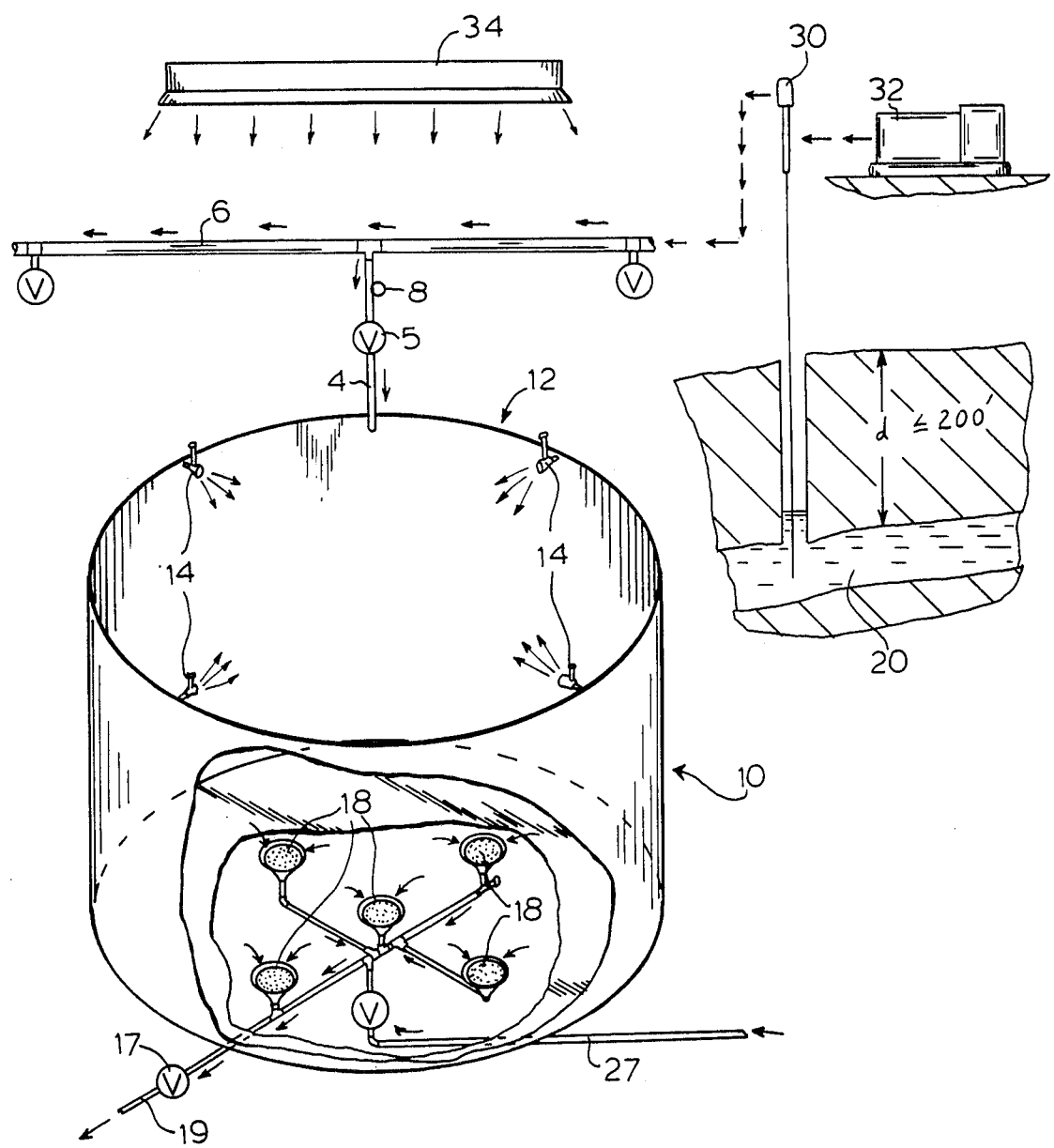
FIG. 1 is a perspective view of a combined apparatus according to the present invention.

Referring to FIGS. 1 through 3a, it can be seen that an essential element of the present invention is a fresh salt water bath such as that housed in a tank 10 wherein bivalves recovered from the marine environment are deposited. While the bath vessel can be of nearly any convenient configuration, it has been found that a circular configuration as is shown in FIG. 1 is particularly effective. In order to effect the necessary depuration efficiently, certain parameters have been found to be essential to the invention.

In particular, it is desired that the fresh salt water bath be maintained at a temperature of from about 46° F. to about 54° F., and preferably is kept at a temperature range of from about 48° F. to about 52° F. Different elements of the process bear on this maintenance of temperature range, but it has been found that by providing the fresh salt water to the bath from an aquifer of not more than about 200 feet below the earth's surface, and preferably between 75 and 80 feet below the earth's surface, at a flow rate of from about 0.5 to about 2.0 gallons per minute per bushel of bivalves, and preferably 1.0 gallon per minute per bushel, this temperature can be maintained.

Referring to the systems shown in the drawings, the flow rate can be maintained by a combination of fluid introducing elements such as flow pipe 6 connected to fluid injection conduit 4 which has a valve 5 and a flow metering alarm unit 8 fixed thereon to warn the user, among other things, of a flow rate which is below that required to effect purification. The source of fresh salt water is shown as an aquifer 20 which is located at a depth "d," not more than 200 feet below the earth's surface. Water can be been recovered from the aquifer 20 by means of a water pump 30, which can be powered by a power unit 32. Injection conduit 4 directs fresh salt water into distribution pipe 12, which, in one embodiment, can be about an inch and a half pipe.

Figure 2:
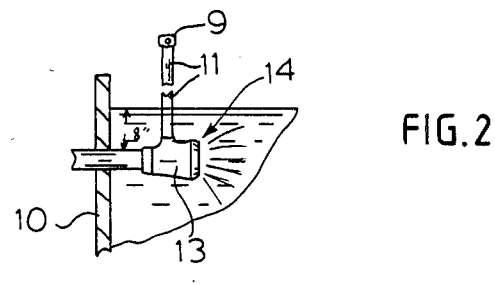
FIG. 2 is a detail taken from FIG. 1 as indicated.

Injection ports 14 are fixed for fluid communication to distribution conduit 12 so that the continued introduction of water can be maintained into the vessel 10. Referring to FIG. 2, one of the injection ports 14 can be seen in detail. Specifically, there is shown a fluid injection nozzle 13 on which has been fixed an air introduction vent 11 having air adjustment cap 9. The nozzle can preferably be fixed anywhere from 0 to about 8 inches below the surface of the water. By use of the air vent 11 and air adjustment cap 9, the oxygen level can be maintained in the fresh salt water at the desired level of from about 4 to about 12 parts per million, and is preferably about 7 parts per million.

In order to attain the most effective depuration water bath system, it is desired to provide a water bath in which there are absolutely no dead spots of non-circulating water. Consequently, the apparatus shown in the drawings has been provided with 5 tank drains 18 shown here with one arranged in the center of the circular bottom of the tank while the other 4 are arranged symmetrically thereabout. While it may be possible to provide other means for maintaining circulation of the bath water throughout a water bath tank, this particular configuration has been found to be synergistic in that it requires no moving parts nor excessively high velocity water introduction to achieve continuously moving water throughout. As shown in the Figure, the drains 18 lead to a bath removal line 19 which can be controlled by a valve 17. Conveniently, an additional water introduction pipe 27 can be provided for introducing wash down water into the vessel for purposes of cleaning during non-operation. The water bath apparatus can also include a irradiation means 30 located directly above the vessel, which can be provided with means for irradiating with a purifying radiation, such as ultraviolet light, etc. The combination of the present invention has been found to be particularly effective since the entire vessel can be adequately purified between operating cycles by irradiating for only from about 1 to about 12 hours, and preferably more than about 6 hours, after the vessel has been drained and flooded with wash down fluid.

Figure 4:
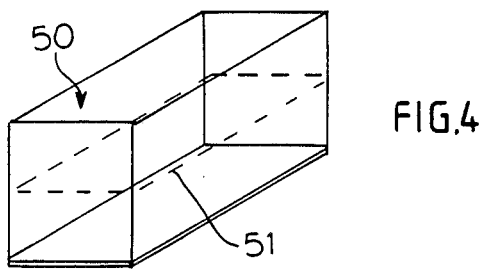
FIG. 4 depicts a bivalve container for use with the present invention.
Figures 3, 3A:
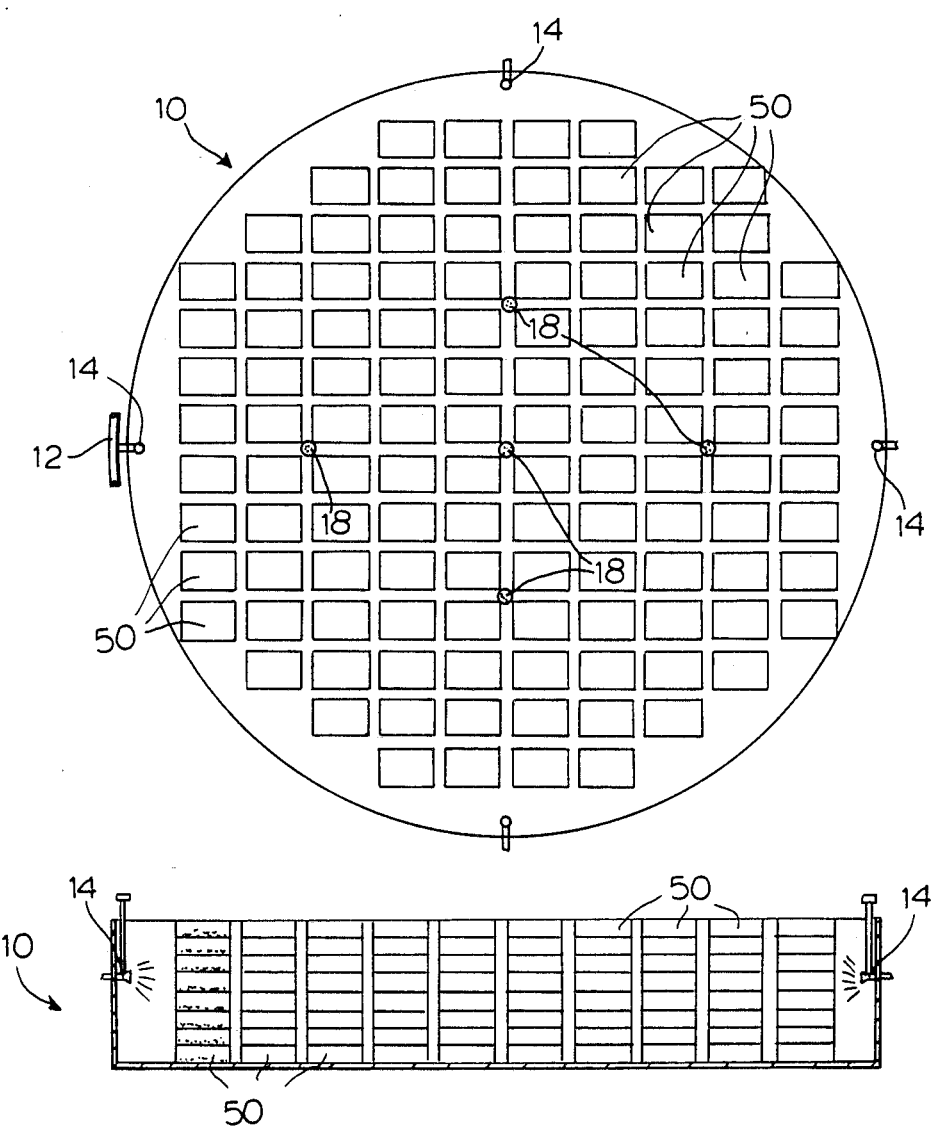
FIG. 3 is a schematic plan view of the tank portion of the apparatus.
FIG. 3a is a elevated cross-section of the schematic as shown in FIG. 3.

Referring specifically to FIGS. 3, 3a and 4, the system of the present invention is shown in schematic form while in operation. FIG. 3 is a plan view of the vessel 10 which has been loaded with stacks of containers 50 (shown in detail in FIG. 4), which in turn can have a removable shelf 51 fixed therein for arranging bivalves preferably not more than in a 3 inch layer on the shelf 51 or the bottom of the container 50. FIG. 3a shows an elevated cross-section of the vessel 10 shown in FIG. 3 with the containers of bivalves stacked therein. The upper panels and all sides of the containers preferably are perforated to allow for maximum circulation of water. The bottoms of the container should have some type of fixation means known in the art for mating relationship with the container therebelow, while the tops of the containers can have a receiving characteristic for stacking another container thereon.

In one embodiment the vessel can be mounted on a water borne vessel for moving from location to location to accommodate the various beds of bivalves as well as to accommodate the location of the desirable aquifers.

It should also be noted that as an added feature the continued depuration causes reduced contamination in the marine environment from which the bivalves were removed by directing the fresh salt water back to the marine location in a comparatively purified state resulting from the reduction in contaminant part per million.

Figure 5:
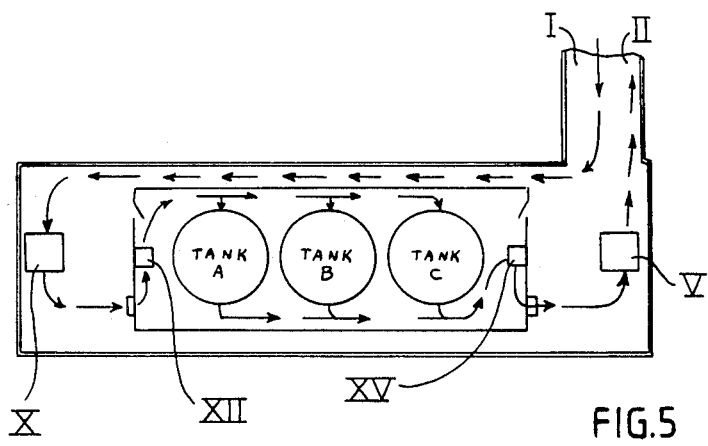
FIG. 5 shows an integrated system using the present depurifying system.

Referring to FIG. 5 a flow diagram is shown for a complete system in which the bivalves are introduced along flow path I into a refrigeration storage means X and thence to a sorting or sizing means XII. The bivalves can then be directed in parallel, i.e., through a circuit delivery system to one of three tanks, depending on the cycle of operation of each tank. Thus, in the initial stages of operation tank A can be filled with the required number of containers of bivalves and processed for 48 hours whereupon the bivalves can be removed and the incoming bivalves be directed into tank B until it is likewise filled. In the meantime tank A can be subjected to a draining and purification cycle while tanks B and tank C are utilized for introducing and subjecting the bivalves to depuration. The purified bivalves can then be transferred to a cleansing container XV and stored in a storage unit V, such as a refrigerator. Finally, the purified bivalves can be directed from the system along flow path route II.

Surprisingly, by use of the present invention, it has been found that a very quick and efficient depuration system can be provided for bivalves taken even from uncertified waters without fear of remaining contaminants and without any degrading effects to the texture and quality of the bivalve meat. This system is ideally suited for servicing bivalve recovery intended to support restaurant and fresh food markets. Other uses and applications will be appreciated by those skilled in the art.

While there have been described what are presently believed to be the preferred embodiments of the invention, those skilled in the art will realize that changes in modifications may be made thereto without departing from the spirit of the invention, and it is intended to claim all such changes and modifications as fall within the true scope of the invention.

I claim:

1. In a process for preparing bivalves for human consumption by depuration of the bivalves in a circulating bath of salt water, the improvement by which pretreatment with ultraviolet radiation and the requirement for process treatment steps of ultraviolet radiation, heating, and salination are eliminated, said improvement comprising:

depositing said bivalves recovered from a marine environment in a fresh salt water bath of circulating water maintained at a temperature of from about 46° F. to about 54° F., said bath comprising at least one circular vessel for holding containers of bivalves under liquid which includes several injection ports arranged symmetrically around the top of said vessel and several drains arranged symmetrically in the bottom of said vessel whereby there are no dead spaces of noncirculating fresh salt water, providing said fresh salt water to said bath from an aquifer not more than about 200 feet below the earth's surface at a flow rate of from about 0.5 to about 2.0 gallons per minute per bushel of bivalves, and maintaining the oxygen level in said fresh salt water bath at a level of from about 4 to about 12 ppm by introducing air into said fresh salt water without the use of an aeration zone, whereby bivalves recovered from uncertified waters are sufficiently purified for human consumption.

2. The process of claim 1 wherein said bivalves are deposited in said bath within 48 hours of recovery.

3. The process of claim 1 wherein said bivalves are deposited in said bath within 12 hours of recovery.

4. The process of claim 1 wherein said temperature of said fresh salt water bath is from about 48° F. to about 52° F.

5. The process of claim 1 wherein said bivalves are deposited for at least about 48 hours before removal for human consumption.

6. The process of claim 1 wherein said aquifer is from about 75 feet to about 80 feet below the earth's surface.

7. The process of claim 1 wherein the toxic mineral level in said fresh salt water is acceptably low.

8. The process of claim 1 wherein said oxygen level is about 7 ppm.

9. The process of claim 1 wherein said oxygen level is maintained by introducing air into said fresh salt water bath.

10. The process of claim 1 wherein said bivalves are deposited in said bath in layers which are not more than about 3 inches in depth.

11. The process of claim 1 wherein said flow rate is about 1.0 gallon per minute per bushel.

12. The process of claim 1 which further comprises purification of said bath container by irradiating said bath when empty with ultraviolet radiation for from about 1 to about 12 hours.

13. The process of claim 12 wherein said bath container is irradiated for at least about 6 hours.

14. In apparatus for preparing bivalves for human consumption by depuration of the bivalves in a circulating bath of salt water, the improvement by which pretreatment with ultraviolet radiation and the requirement for process treatment steps of ultraviolet radiation, heating, and salination are eliminated, said improvement comprising in combination:

at least one circular vessel for holding containers of bivalves under liquid, said vessel comprising several injection ports arranged symmetrically around the top of said vessel and several drains arranged symmetrically in the bottom of said vessel maintaining a liquid flow therethrough in the absence of dead spaces of noncirculating water at from about 0.5 to about 2.0 gallons per minute per bushel of bivalves, a source of fresh salt water connected for delivery of water to said vessel, said source capable of providing fresh salt water having an acceptably low toxic mineral content at a temperature of from about 46° F. to about 54° F. at a flow rate of from about 0.5 to about 2.0 gallons per minute per barrel of bivalves for at least about 48 hours, means for maintaining the oxygen level in said fresh salt water bath at a level of from about 4 ppm to about 12 ppm as said water is introduced into said vessel.

15. The device of claim 14 wherein said vessel has a depth of from about 1' to about 6'.

16. The device of claim 14 wherein said vessel is about 4' and wherein said containers of bivalves can be stacked to a height of up to about 4'.

17. The device of claim 14 wherein there are four said injection ports arranged symmetrically around the top of said vessel and there are five drains in the bottom of said vessel, one said drain located at the center of said bottom and four other said drains arranged symmetrically around said center drain.

18. The device of claim 14 wherein said means for maintaining said oxygen level comprises air inlet vents formed on each said injection port whereby reduced pressure created by fluid flow through each said injection port induces air into said fresh salt water.

19. The device of claim 14 mounted on a water borne vessel for movement to different marine locations.

20. The device of claim 14 wherein said vessel further comprises an overhead purification means whereby said vessel is purified.

21. The device of claim 20 wherein said purification means comprises a source of purifying radiation selected from the group consisting of infrared, ultraviolet, ultrasonic and microwave.

22. The device of claim 14 wherein said source of fresh salt water comprises a salt water-containing aquifer of not more than about 200 feet below the earth's surface.

23. The device of claim 23 wherein said aquifer is at a depth of from about 75 feet to about 80 feet.

* * * * *